(12) United States Patent
Shankwitz et al.

(10) Patent No.: US 9,310,808 B2
(45) Date of Patent: Apr. 12, 2016

(54) APPARATUS AND METHOD FOR AUTONOMOUS CONTROL AND BALANCE OF A VEHICLE AND FOR IMPARTING ROLL AND YAW MOMENTS ON A VEHICLE FOR TEST PURPOSES

(71) Applicant: MTS Systems Corporation, Eden Prairie, MN (US)

(72) Inventors: Craig Robert Shankwitz, Minneapolis, MN (US); Arthur Richard Baker, III, Excelsior, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 118 days.

(21) Appl. No.: 13/841,408

(22) Filed: Mar. 15, 2013

(65) Prior Publication Data

US 2014/0277895 A1    Sep. 18, 2014

(51) Int. Cl.
*G01C 21/00* (2006.01)
*G05D 1/08* (2006.01)
*G01M 17/007* (2006.01)

(52) U.S. Cl.
CPC ........... *G05D 1/0891* (2013.01); *G01M 17/007* (2013.01)

(58) Field of Classification Search
None
See application file for complete search history.

(56) References Cited

U.S. PATENT DOCUMENTS

| | | | |
|---|---|---|---|
| 3,546,814 A | 12/1970 | Melendez | |
| 4,200,160 A | 4/1980 | Newcomb | |
| 4,342,175 A | 8/1982 | Cemansky et al. | |
| 5,368,516 A * | 11/1994 | Hoeting et al. | ............... 446/288 |
| 5,465,612 A | 11/1995 | La Belle | |
| 5,542,290 A | 8/1996 | Suzuki | |
| 5,657,227 A | 8/1997 | Freitag | |
| 5,960,900 A | 10/1999 | Cheng | |
| 6,074,271 A * | 6/2000 | Derrah | ......................... 446/457 |
| 6,360,838 B1 | 3/2002 | Kulhavy | |
| 6,918,467 B2 | 7/2005 | Kasten | |
| 2005/0166413 A1* | 8/2005 | Crampton | ...................... 33/503 |
| 2008/0227365 A1 | 9/2008 | Lo | |
| 2011/0118941 A1 | 5/2011 | Linker et al. | |
| 2012/0325970 A1* | 12/2012 | Hamilton | ............... B64G 1/283 244/165 |

OTHER PUBLICATIONS

Almujahed, Deweese, Duong, and Potter, "Auto-Balanced Robotic Bicycle (ABRB)," http://ece.gmu.edu/facultyly/ppach/ECE_Awards/ShortReports/S-09-ABRB.pdf, Electrical and Computer Engineering Department, Volgenau School of Engineering, George Mason University, Spring 2009, 7 pages.

(Continued)

*Primary Examiner* — Adam Alharbi
(74) *Attorney, Agent, or Firm* — Steven M. Koehler; Westman, Champlin & Koehler, P.A.

(57) ABSTRACT

An autonomous vehicle control system for use on a vehicle, such as a motorcycle or an all-terrain vehicle (ATV) to autonomously control the vehicle without a driver during vehicle testing is provided. The vehicle control system comprises a moment generator coupleable to the vehicle and configured to selectively generate a moment in either of first and second directions. The vehicle control system also includes a control system operably coupled to the moment generator and configured to control the moment generator to selectively impart moments on the vehicle to stabilize the vehicle or to introduce disturbances on the vehicle.

16 Claims, 9 Drawing Sheets

(56) References Cited

OTHER PUBLICATIONS

LitMotors, "We know you have questions," http://litmotors.com/faq, at least as early as Feb. 2013, 6 pages.

Hackaday, "Self-stabilizing autonomous bicycle," http://hackaday.com/2012/03/25/self-stabilizing-autonomous-bicycle/, at least as early as Mar. 2012, 12 pages.

Zhang, Li, Yi, and Song, "Balance Control and Analysis of Stationary Riderless Motorcycles," IEEE International Conference on Robotics and Automation (ICRA,) 2011, pp. 3018-3023.

International Search Report and Written Opinion from the European Patent Office for corresponding International Application No. PCT/US2014/024378, filed Mar. 12, 2014, mail date Jul. 29, 2014.

* cited by examiner

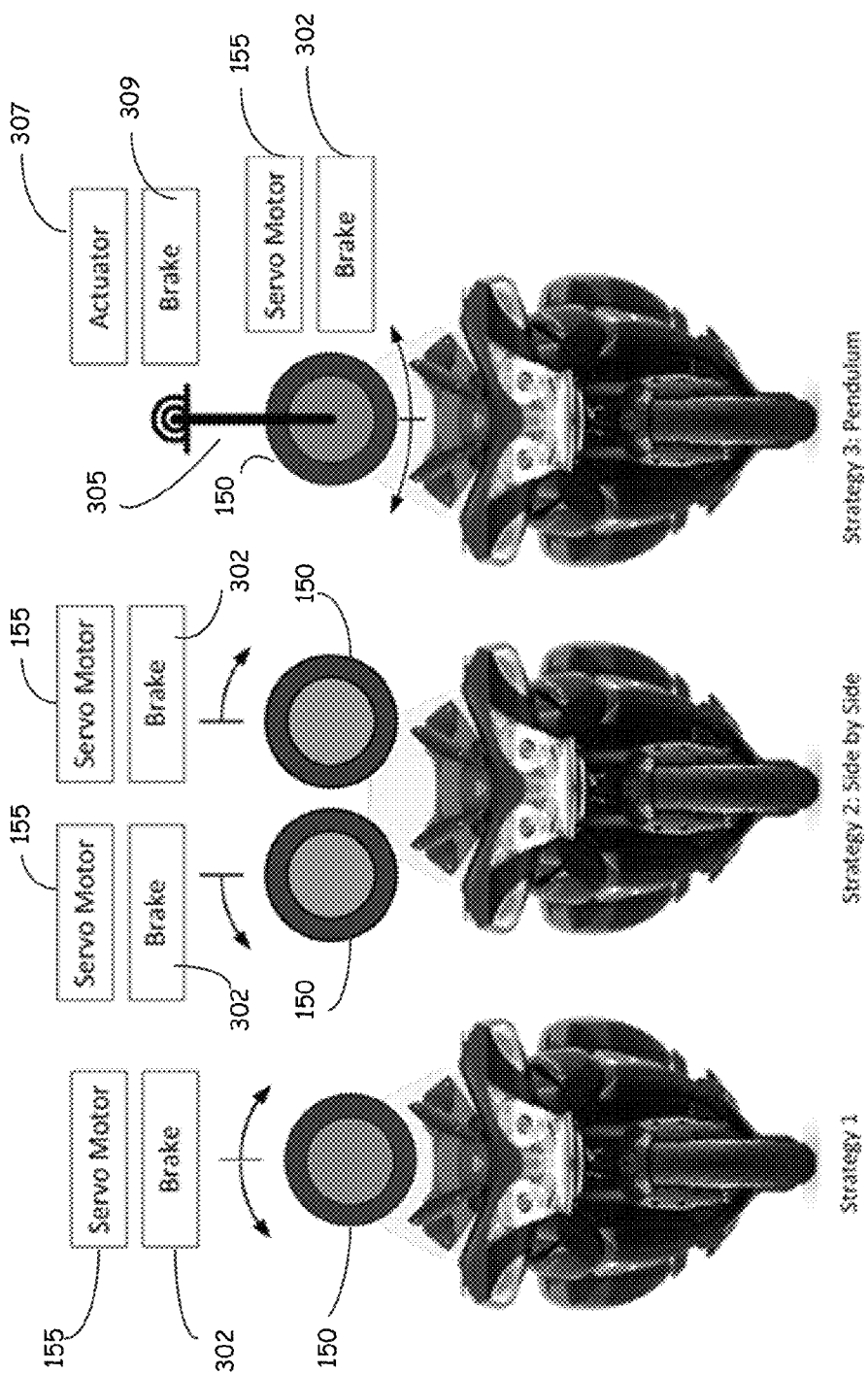

US 9,310,808 B2

APPARATUS AND METHOD FOR AUTONOMOUS CONTROL AND BALANCE OF A VEHICLE AND FOR IMPARTING ROLL AND YAW MOMENTS ON A VEHICLE FOR TEST PURPOSES

FIELD

Disclosed embodiments relate to durability and performance testing of motorcycles and other vehicles. More particularly, disclosed embodiments related to apparatus and methods of providing autonomous control of a vehicle in a manner which allows the vehicle to be tested for durability and/or performance without the need for a human driver.

BACKGROUND

Vehicles such as motorcycles and all-terrain vehicles (ATVs) frequently undergo performance or durability testing under harsh conditions. These conditions may include high or low temperatures, rough test courses, and long durations of continuous or nearly continuous operation of the vehicle. Frequently, these performance or durability tests are so extreme that they end up testing the driver of the vehicle more than they test the vehicle itself. For example, to properly warm up a motorcycle for such testing, it may be necessary for the driver to operate the motorcycle at slow speeds for a prolonged period of time. Since the rider will typically wear protective gear that limits cooling of the driver, and since such testing commonly takes place in desert or other warm weather locations, the test driver may only be able to endure this difficult test environment for a relatively small amount of time.

Due to the physical demands of driving a motorcycle during durability or performance testing, it is common for drivers to be able to work only a few hours before requiring rest. This can increase the costs of testing. Also, it is common for drivers of motorcycles during durability or performance testing to experience work related injuries as a result of the physical demands placed upon them. Often, motorcycle testing results in both short term and long term physical disabilities for test riders. In addition to human toll, these factors also add to the costs of testing. Further still, to adequately test electronic stability control systems or anti-lock brake systems on a motorcycle, ATV or similar vehicle, the driver may be put in significant danger, which may not be a plausible risk to incur.

To avoid the physical toll on test drivers and also to avoid the associated costs, testing such vehicles without a human driver would prove desirable in some instances. However, at very low speeds (e.g., speeds (e.g., less than ~1 meter/second) motorcycles are very unstable, making any automated control of the motorcycle steering difficult. In this so-called "capsize mode" of operation, a human driver manipulates body position to stabilize the motorcycle. Without a human driver, such stabilization is very difficult using only steering inputs. Further, even at higher speeds (e.g., speeds greater than ~1 meter/second), sometimes referred to as the "weave mode", where the motorcycle is more stable due to due to its geometry, mass distribution, and gyroscope effect of the wheels, without a human driver it is difficult to test the motorcycle performance and durability in situations where a human driver would use body positioning to compensate during disturbances (e.g., wind gusts) and during normal turning, etc. The speed at which the transition from capsize to weave occurs is dependent on a vehicle mass, rake angle, wheelbase, etc.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An autonomous vehicle control system for use on a vehicle, such as a motorcycle or an all-terrain vehicle (ATV) to autonomously control the vehicle without a driver during vehicle testing is provided. The vehicle control system comprises a moment generator coupleable to the vehicle and configured to selectively generate a moment in either of first and second directions. The vehicle control system also includes a control system operably coupled to the moment generator and configured to control the moment generator to selectively impart moments on the vehicle to stabilize the vehicle or to introduce disturbances on the vehicle.

BRIEF DESCRIPTION OF THE DRAWINGS

FIGS. 2-1 and 2-2 are block diagram illustrations showing further details of example components of an autonomous control system.

FIGS. 3-1 through 3-3 are diagrammatic illustrations of various example embodiments of a moment generating system which can be used in an autonomous control system.

FIGS. 4-1, 4-2, 4-3 and 5 are illustrations of example embodiments of moment generation system embodiments which include lateral translation capability for laterally moving a reaction wheel.

DETAILED DESCRIPTION OF ILLUSTRATIVE EMBODIMENTS

Disclosed embodiments facilitate the autonomous performance and durability testing of motorcycles, ATVs, or other vehicles on test tracks or highways. The following description is provided with reference to motorcycles, but those of skill in the art will understand that the disclosed embodiments can be used, or adapted to be used, with these other vehicle types. With an autonomous system, performance testing can occur at the limits of vehicle dynamic capability without putting a rider at risk (even in low coefficient of friction environments (wet pavement)). Often, motorcycle testing results in both short term and long term physical disabilities on test riders. Using autonomous motorcycle control systems as disclosed will provide the durability and performance data needed to improve these vehicles without the physical damage typically experienced by the test rider.

The embodiments described herein facilitate two actions which are beneficial for both performance and durability testing. First, disclosed are a method and apparatus to provide a pure mechanical roll moment needed to stabilize a motorcycle at zero or low speeds (where the predominant instability mode is capsize) in the presence of roll disturbances and without the use of outriggers or other physically stabilizing mechanisms (i.e., "training wheels"). The use of outriggers and other mechanical stabilizing devices change the roll and yaw dynamics of the motorcycle, reducing the fidelity with which the durability and performance tests will be executed. Disclosed embodiments overcome this limitation of outriggers.

Second, disclosed methods and apparatus provide both pure roll and (optionally) yaw moments to vehicles operating in the "weave" operational mode (e.g., speeds greater than ~1 meter/second) where the motorcycle is comparatively more stable than the capsize mode of operation. In the "weave" mode, speeds are sufficiently high so that the motorcycle, without a rider, is marginally stable. In this mode, a marginally stable motorcycle will balance and travel without a rider for a time period, but will eventually become unstable, weave and crash. In the marginally stable, weave mode regime, a stabilizing feedback controller was designed which provides roll control and stability through steering inputs. Using steering to stabilize and control the motorcycle frees the disclosed embodiments to impart both a pure roll moment (simulating a motorcycle rider's rotation of the upper body in the roll axis) and/or a pure yaw moment (simulating the rotation of a motorcycle rider's upper body in the yaw axis) to the motorcycle, offering a repeatable means by which the motorcycle under test can be exposed to particular simulated rider roll and yaw behaviors. Repeatability is important for both durability and performance testing.

Figure 1:
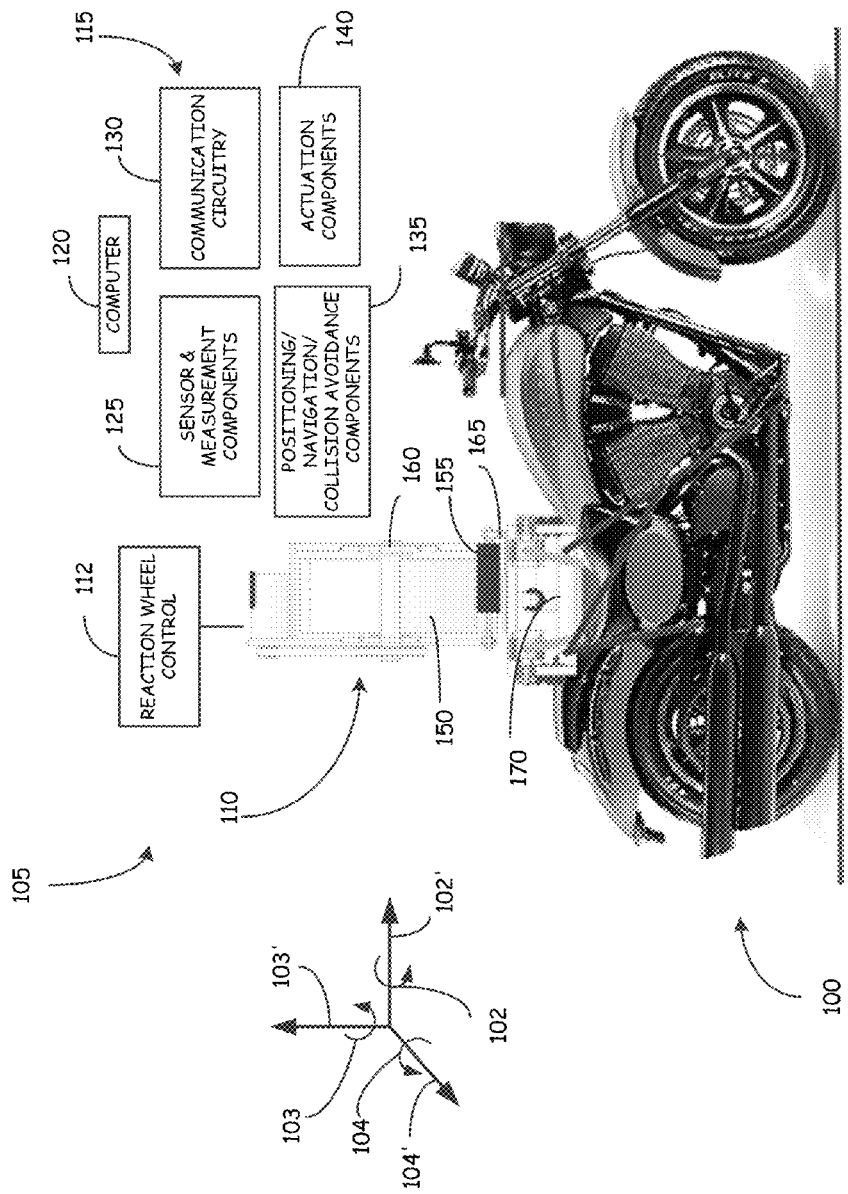
FIG. 1 is a diagrammatic view of a motorcycle with an autonomous control system in accordance with example embodiments.

Referring now to FIG. 1, shown is a motorcycle 100 having an autonomous control system 105 installed which allows motorcycle 100 to undergo performance and/or durability testing without the need for a human driver. Autonomous control system 105 includes a moment generating system 110 and a navigation and control system 115. Navigation and control system 115 includes numerous subsystems and components which are described below. The components of navigation and control system 115 can work with moment generating system 110 and, in some embodiments, can be considered to be included in moment generating system 110. Further, the illustrated components of system 115 need not all be included in every embodiment. For illustrative and discussion purposes, the components of navigation and control system 115 are categorized here as computer related components 120, sensor & measurement components 125, communication circuitry 130, positioning, navigation & collision avoidance components 135, and actuation components 140. These components control position determination, communication with a base or control station or with other autonomously operated vehicles on a test track, and motorcycle operation functions such as shifting, braking, steering, etc.

Figures 1, 2:
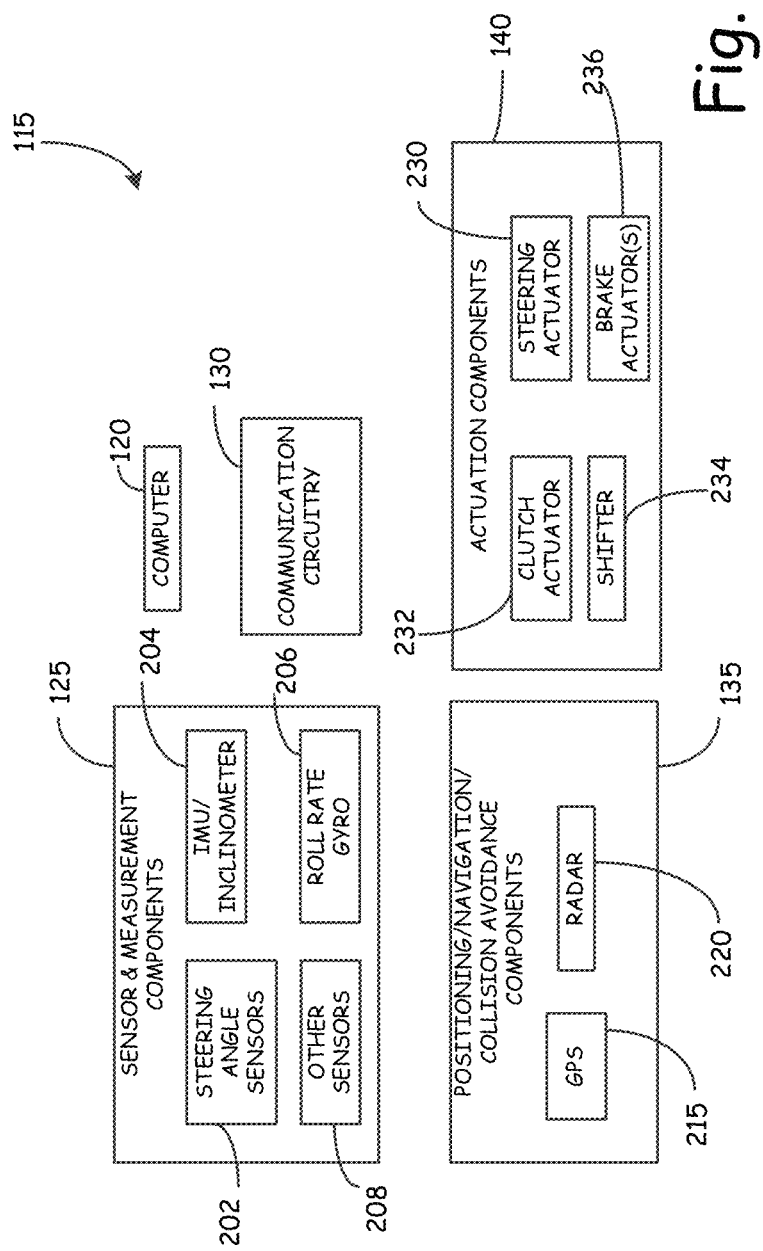
Figure 2:
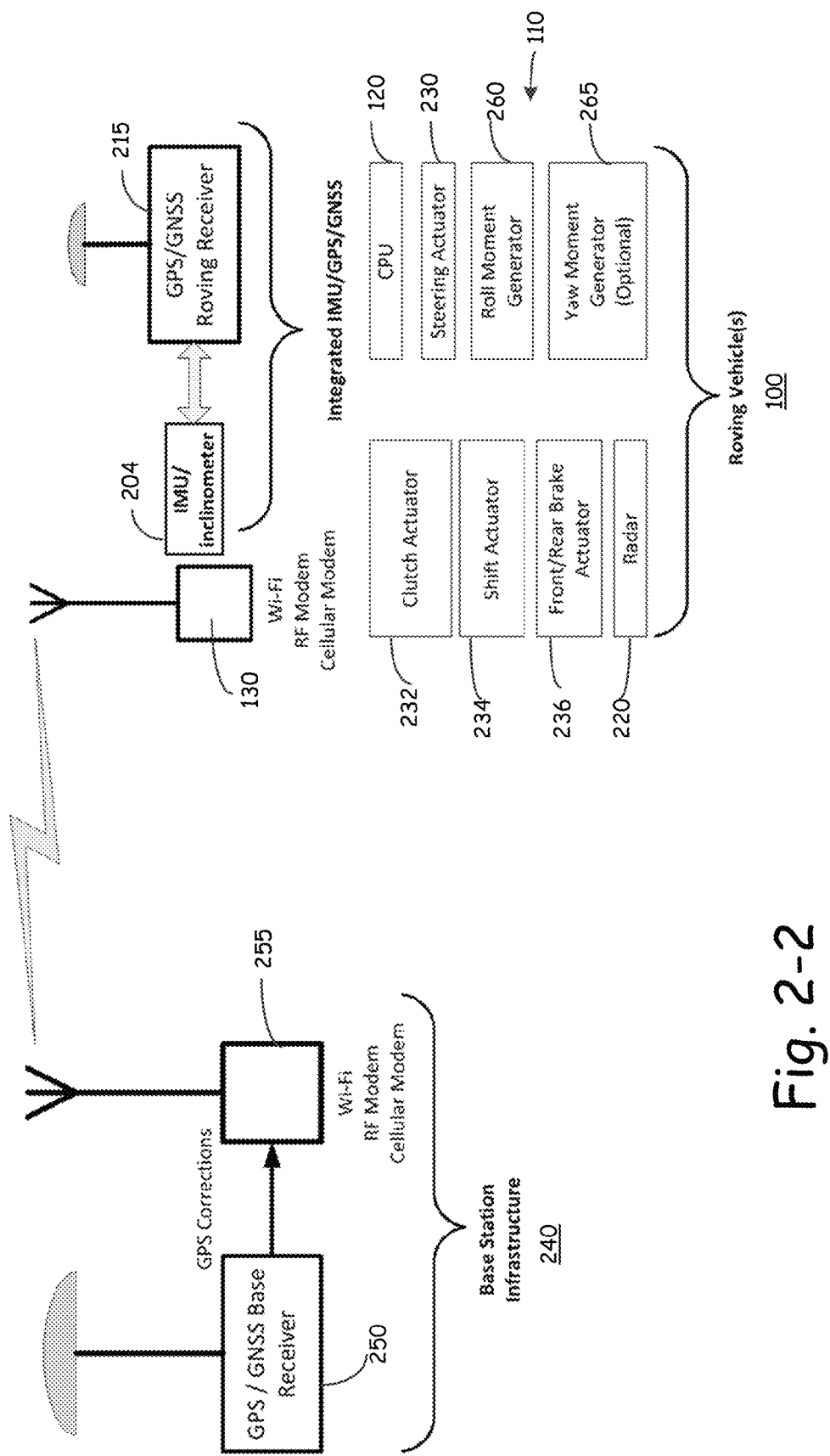

Referring for the moment to FIG. 2-1, shown are further details of example components of navigation and control system 115 in some embodiments. As shown, sensor & measurement components 125 can include steering angle sensor 202, inertial measurement unit (IMU) and optional inclinometer 204, roll rate gyro 206 and other sensors 208. Positioning, navigation & collision avoidance components 135 can include global position system (GPS) or other type of global navigation satellite system (GNSS) receiver 215 and radar 220. Actuation components 140 can include steering actuator 230, clutch actuator 232, shifter 234, and brake actuator(s) 236. Communication circuitry 130 can be any type of communication device (e.g., Wi-Fi, cellular, radio frequency transmitters and receivers, etc.) which provides communication with a remote position such as at a control or base station, communication with other vehicles on the test track, communication with a GPS base station when differential GPS systems are used for improved position determination, etc.

Referring back to FIG. 1, moment generating system 110 serves several unique purposes. First, moment generating system 110 stabilizes motorcycle 100 at zero and low speeds (in the capsize regime) using a sensor-driven, computer controlled reaction wheel/moveable mass system. The reaction wheel 150, which is of a mass representative of a "typical" motorcycle rider's upper body mass, can be spun about an axle or axis 160 and is accelerated or decelerated by a drive motor 155 having a brake 302 (shown in FIGS. 3-1 through 3-3) to provide stabilizing roll moments 102 (moment about the axis 102' tangent to motorcycle travel) in response to transient roll disturbances to which the motorcycle is subject through the roll moment created by the acceleration or deceleration of the reaction wheel. The reaction wheel and other components of moment generating system 110 are controlled by a reaction wheel controller 112 in some embodiments. In exemplary embodiments, but not necessarily in all embodiments, if the reaction wheel is also provided the capability to rotate about the yaw axis 103', stabilizing yaw moments 103 can also be supplied to the motorcycle to improve roll stability at low speeds. In some exemplary embodiments, yaw moment generator or actuator 165 rotates reaction wheel 150 about vertical axis 170 to create a yaw moment. If the yaw and roll mechanisms are mounted on another mechanism which provides rectilinear motion in the motorcycle lateral axis (represented by axis 104' in the illustrated 3-dimensional coordinate system, but being normal to the plane defined by axes 102' and 103' in a 2-dimensional representation), the mass of the reaction wheel and yaw mechanism can be moved laterally, creating a mechanism to stabilize the motorcycle 100 when it is subjected to persistent roll disturbances. The sensor suite 125 used in the capsize mode includes a roll rate gyro 206 and an inclinometer 204 measuring vehicle roll angle.

At zero or low speeds, referred to here as the capsize mode or regime, the moments imparted on a motorcycle through the use of the handlebar can stabilize the motorcycle over only a small space of initial conditions and transient disturbances. A robust control strategy requires that substantial stabilizing moments be applied to the motorcycle so that the motorcycle remains upright. Several exemplary embodiments can be used to provide this substantial stabilizing moment in response to transient disturbances.

Referring now to FIG. 2-2, shown is another example of infrastructure and on-board equipment which can be used to operate a motorcycle or other vehicle autonomously at a test facility. As shown, a motorcycle or other roving vehicle 100 includes moment generating system 110, which is illustratively shown as a roll moment generator 260 and a yaw moment generator 265. As discussed above, the roll moment generator 260 can be used in producing a yaw moment, and could therefore be considered to be part of yaw moment generator 265 in some embodiments. Other components discussed above with reference to FIG. 2-1 are also shown and are not discussed here. An IMU/inclinometer 204 and a GPS receiver 215 (for example a differential GPS receiver) are included, and can be in the form of an integrated IMU/GPS or IMU/GNSS system or device. Communication circuitry 130 in the form of Wi-Fi circuitry, an RF modem, a cellular modem, etc., communicates with communication circuitry 255 at a base station 240 to receive differential positioning signals from base receiver 250 to increase the accuracy of the positioning receiver 215 on motorcycle 100.

Accurately guided autonomous vehicles can be used to precisely follow a specified trajectory (speed, position, acceleration, and optionally roll angle depending upon the operating regime). Using centimeter-accurate GPS as a position measurement system, a riderless motorcycle can repeatedly follow a specified trajectory, which facilitates the generation of durability data which exhibits low variance and few outliers.

Figures 2, 4:
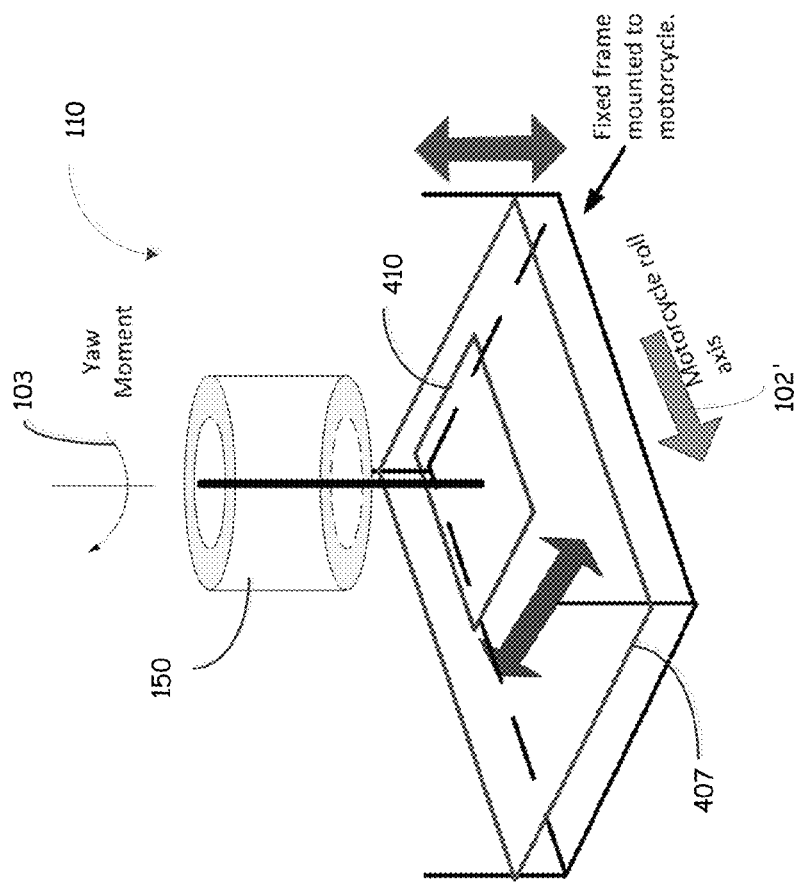
Figures 1, 4:
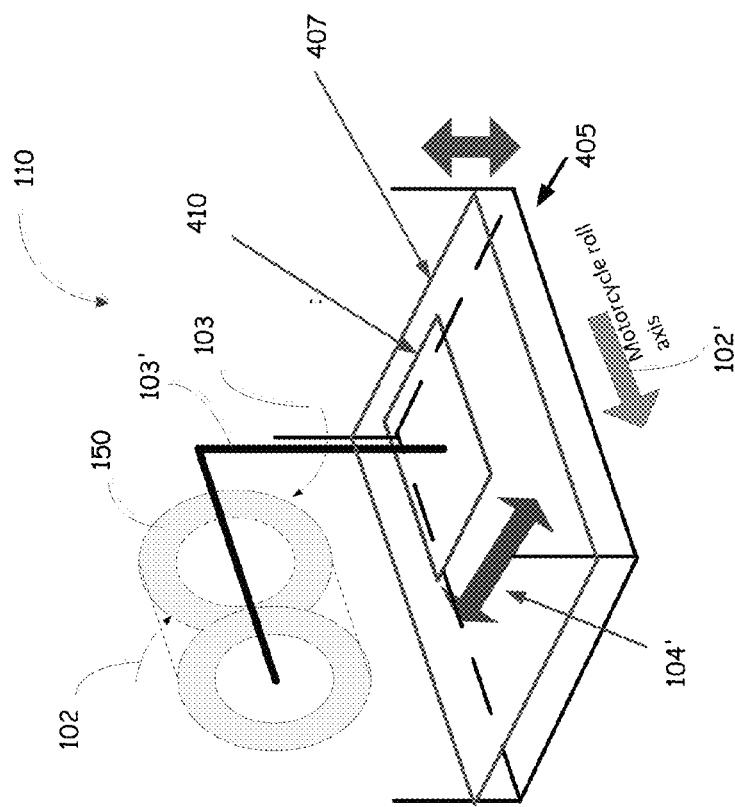
Figure 5:
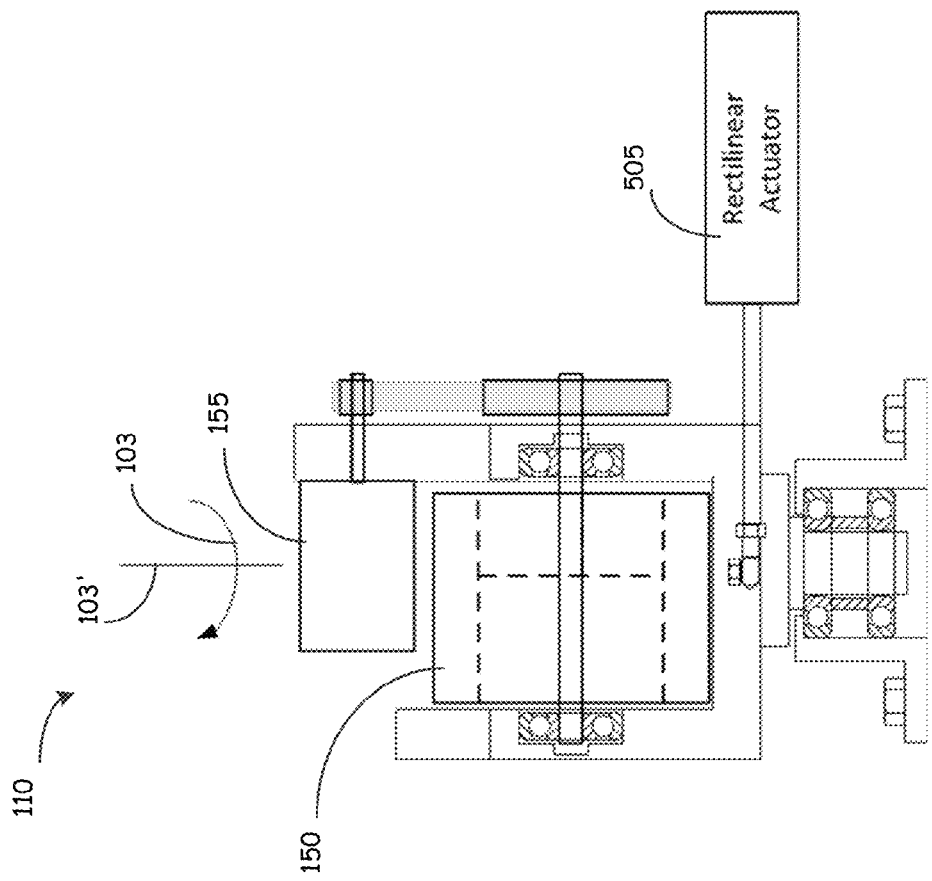
Figures 3, 4:
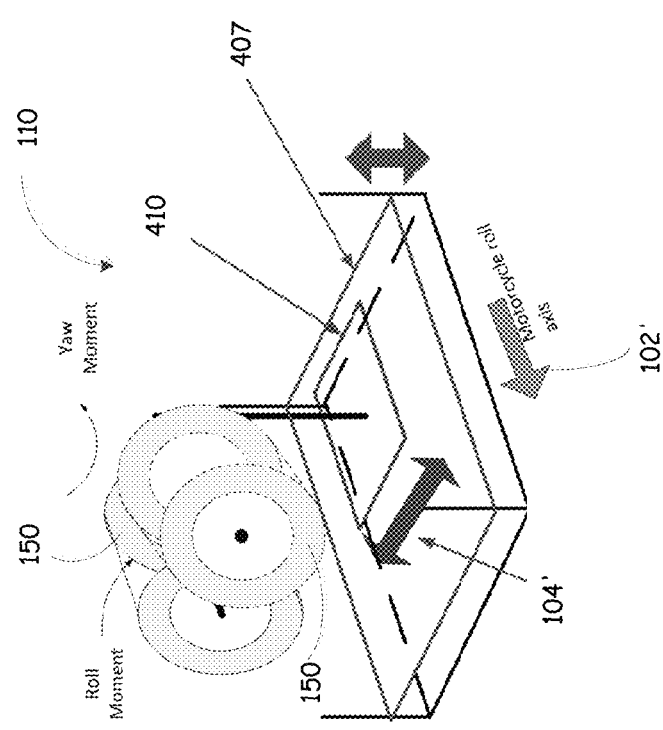

In a first embodiment represented diagrammatically in FIG. 3-1, moment generating system 110 includes a single nominally stationary or slowly moving reaction wheel 150 which is accelerated or decelerated using motor 155 and/or brake 302 to create a stabilizing roll moment 102 (shown in FIG. 1). In this embodiment, a single reaction wheel 150 is driven by an electric, hydraulic or other type of servo motor 155 as a mechanism to impart the stabilizing roll moment and/or to reject a transient roll disturbance (e.g., such as a wind gust, a lateral force applied to the motorcycle, etc.). The motor 155 is configured to rotate reaction wheel 150 in either of two directions, and thereby generates torque in either of the two directions. A linear quadratic optimal controller or other optimal control technique is used to keep the nominal speed of the motor at zero to maximize the available moment provided by the servo motor needed to compensate for the next transient roll disturbance.

In a second embodiment represented diagrammatically in FIG. 3-2, moment generating system 110 includes a pair of reaction wheels 150. In this embodiment, motor 155 is a pair of motors used to spin the pair of reaction wheels at a nominal speed in opposite rotational directions, with external or other brakes 302 used to decelerate one or the other of the reaction wheels to generate the desired roll moment in the necessary direction. Generally, a brake can impose a much higher transient moment on a spinning inertia than can a servo motor, thus facilitating greater roll moments in a shorter period of time. Once the braking event is complete, the braking motor accelerates its reaction wheel back to the nominal rotational rate in preparation for a forthcoming roll disturbance.

In a third embodiment shown diagrammatically in FIG. 3-3, a single reaction wheel 150 is suspended from an actuated pendulum 305 to provide a roll moment to the motorcycle to counteract roll disturbances. The roll moment can be provided purely by the pendulum motion of the mass 150, and a motor 155 for rotation of the mass 150 and a brake 302 for decelerating rotation of mass 150 is not required in all embodiments. However, in other embodiments, the reaction wheel 150 is both rotated by a motor 155 (FIG. 1) and moved by an actuator 307 of the actuated pendulum 305 such that both mechanisms contribute to the roll moment generation. Actuator 307 and pendulum brake 309 are used to accelerate and decelerate the pendulum motion. Like the embodiment shown in FIG. 3-1, in FIG. 3-3 the reaction wheel can be rotated in both directions to control the direction of the roll moment.

Should the motorcycle be subject to persistent roll disturbances (mass imbalance about the vertical axis 103', steady side wind, etc.), the roll and yaw moment generation system 110 can be translated laterally to compensate for this persistent disturbance. The offset of this mass from the motorcycle vertical axis creates a roll moment which can compensate for the persistent roll moment to which the motorcycle is subject. Referring now to FIGS. 4-1, 4-2, 4-3 and 5, shown are example embodiments of moment generation systems 110 which include lateral translation components for moving the reaction wheel(s) laterally. In one embodiment, a fixed frame 405 supports a translation frame 410, which in turn supports (including supporting through coupling with other components) the reaction wheel 150. A rectilinear actuator 505, or other type of actuator, moves the translation frame and reaction wheel laterally along axis 104'. With the ability to generate a roll moment 102 and a yaw moment 103 (using actuator 165 shown in FIG. 1), and with the ability to translate those moments laterally relative to the roll axis of the motorcycle, compensation for persistent roll disturbances and/or non-uniform mass distributions about the motorcycle vertical axis 103' can be implemented. In some embodiments, a support frame 407 is included which supports the translation frame 410 in a manner which provides vertical movement or adjustment of the translation frame relative to the fixed frame 405, but inclusion of support frame 407 and/or vertical movement of the translation frame (and reaction wheel) is not required in all embodiments.

As discussed above, moment generation system 110 can also include a yaw moment generation system. This can be implemented by rotating the reaction wheel frame (e.g., frame 410 or 407 and its components around the vertical axis 103'. Yaw moment actuator 165 (shown in FIG. 1) can be used for such rotation. The axis of the reaction wheel remains parallel to the ground, but rotates relative to the direction of travel. In exemplary embodiments, the frame is rotated so that the axis through the bearings which support the reaction wheel rotate towards the vehicle lateral axis from the vehicle longitudinal axis. The yaw moment is generated by accelerating (in rotation about the vertical axis) the frame which holds the reaction wheel and the motor which drives the reaction wheel about the vertical axis. The reaction wheel can be stationary during this rotation. The angular acceleration of that mass is what generates the yaw moment. FIG. 4-3 diagrammatically illustrates reaction wheel 150 being accelerated rotationally about the vertical or yaw axis to create such a yaw moment.

FIG. 4-2 illustrates a reaction wheel configuration for an alternative yaw moment generator configuration where the reaction wheel has been moved to be on the vertical axis instead of a horizontal axis.

Figure 6:
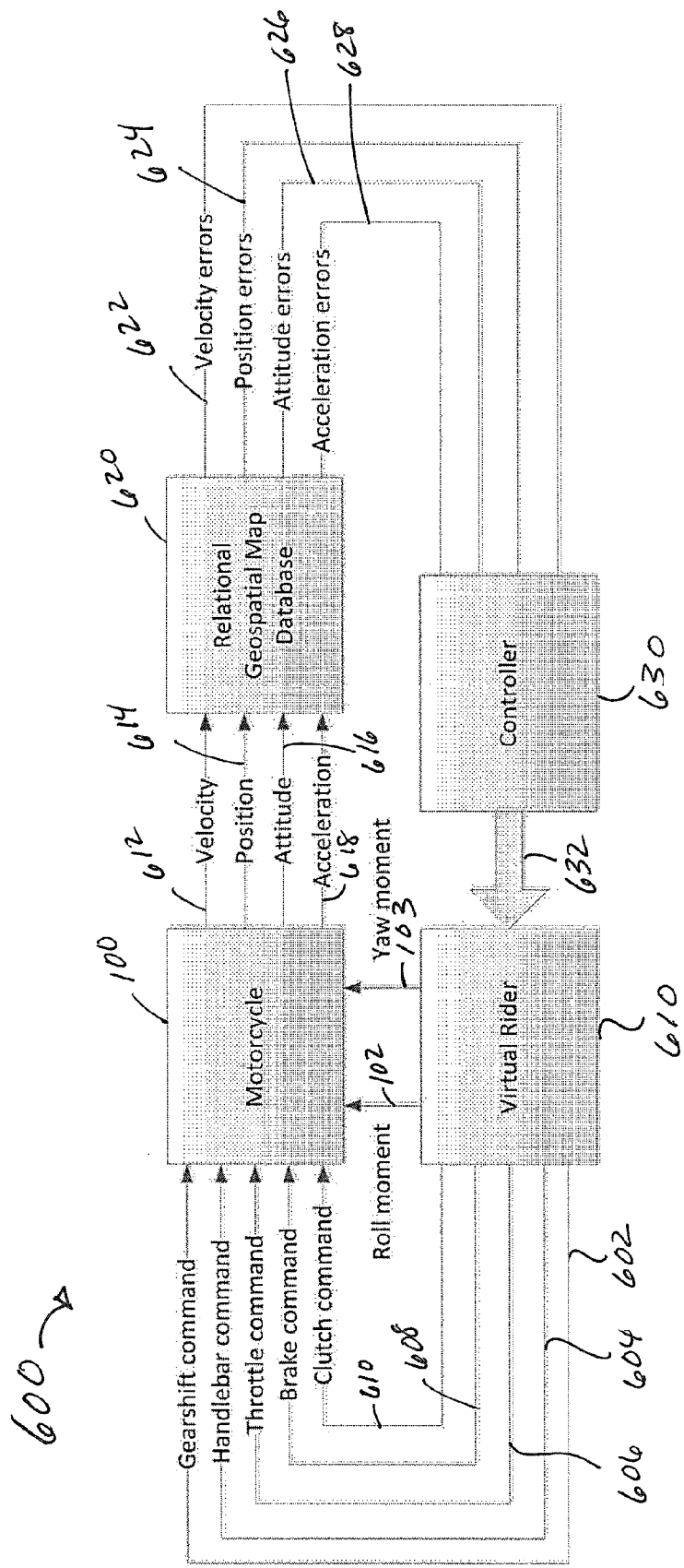
FIG. 6 is a block diagram of a virtual test rider system in accordance with an exemplary embodiment.

Referring now to FIG. 6, shown in block diagram form is a virtual test rider system 600 using the concepts disclosed above with reference to FIGS. 1-5. A virtual rider, which includes moment generation system 110 and other components such as controllers, actuators, etc. as discussed above, generates a gearshift command 602, a handlebar command 604, a throttle command 606, a brake command 608 and a clutch command 610 to control corresponding components on motorcycle 100. The handlebar command controls a steering angle to guide the motorcycle on an intended path. Sensors then provide outputs such as velocity 612, position 614, attitude 616, and acceleration 616. Using a relational geospatial map database and corresponding processing circuitry, it can be determined whether the position, speed, etc. of the motorcycle is deviating from the desired state, and error outputs can be generated. By way of example, in FIG. 6, a velocity error 622, a position error 624, an attitude error 626 and an acceleration error 628 can all be generated, though all are not required in every embodiment. A controller 630 receives these error signals or values and generates commands 632 which cause virtual rider 610 to compensate with values of commands 602, 604, 606, 608 and/or 610, as well as to compensate by generating a roll moment 102 and/or a yaw moment 103. Also, controller 630 can generate commands 632 to cause virtual rider to generate roll or yaw moments for purposes of introduction of disturbances or simulation of human driver behavior.

Figure 7:
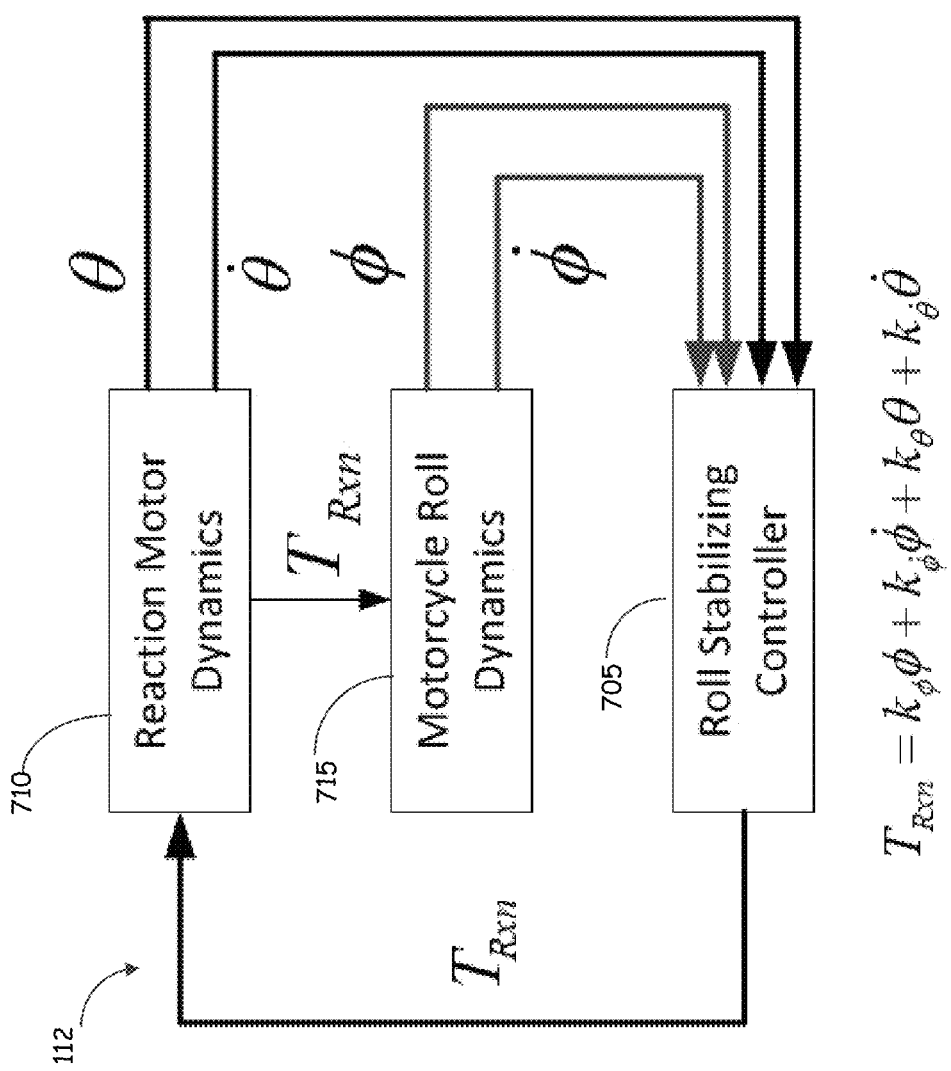
FIG. 7 is a block diagram of a reaction wheel controller in accordance with an exemplary embodiment.

Referring now to FIG. 7, shown is a reaction wheel control scheme implemented by reaction wheel controller 112

(shown in FIG. 1) in some embodiments to keep the driven reaction wheel nominally at zero speed and the motorcycle upright. Both angle and angular rate data are used to stabilize the motorcycle and minimize reaction wheel speed. Reaction wheel controller 112 uses a linear quadratic regulator (LQR) or other optimal controller to generate a torque control signal $T_{Rxn}$ which is used to control the reaction motor 155. In FIG. 7, reaction motor dynamics 710 represents reaction motor 155 in combination with an inclinometer 204 which provides as outputs the angle $\theta$ and the rate of rotation $\theta$-dot of the reaction motor 155. Motorcycle roll dynamics 715 represents motorcycle 100 in combination with the inclinometer 204 which provides as outputs the sensed roll angle $\phi$ and the sensed roll angle rate $\phi$-dot of the motorcycle. An equation which can be used by the LQR controller to generating torque control signal $T_{Rxn}$ is shown in FIG. 7, wherein $k_\phi$, $k_{\phi'}$, $k_\theta$ and $k_{\theta'}$, are constants.

Figure 8:
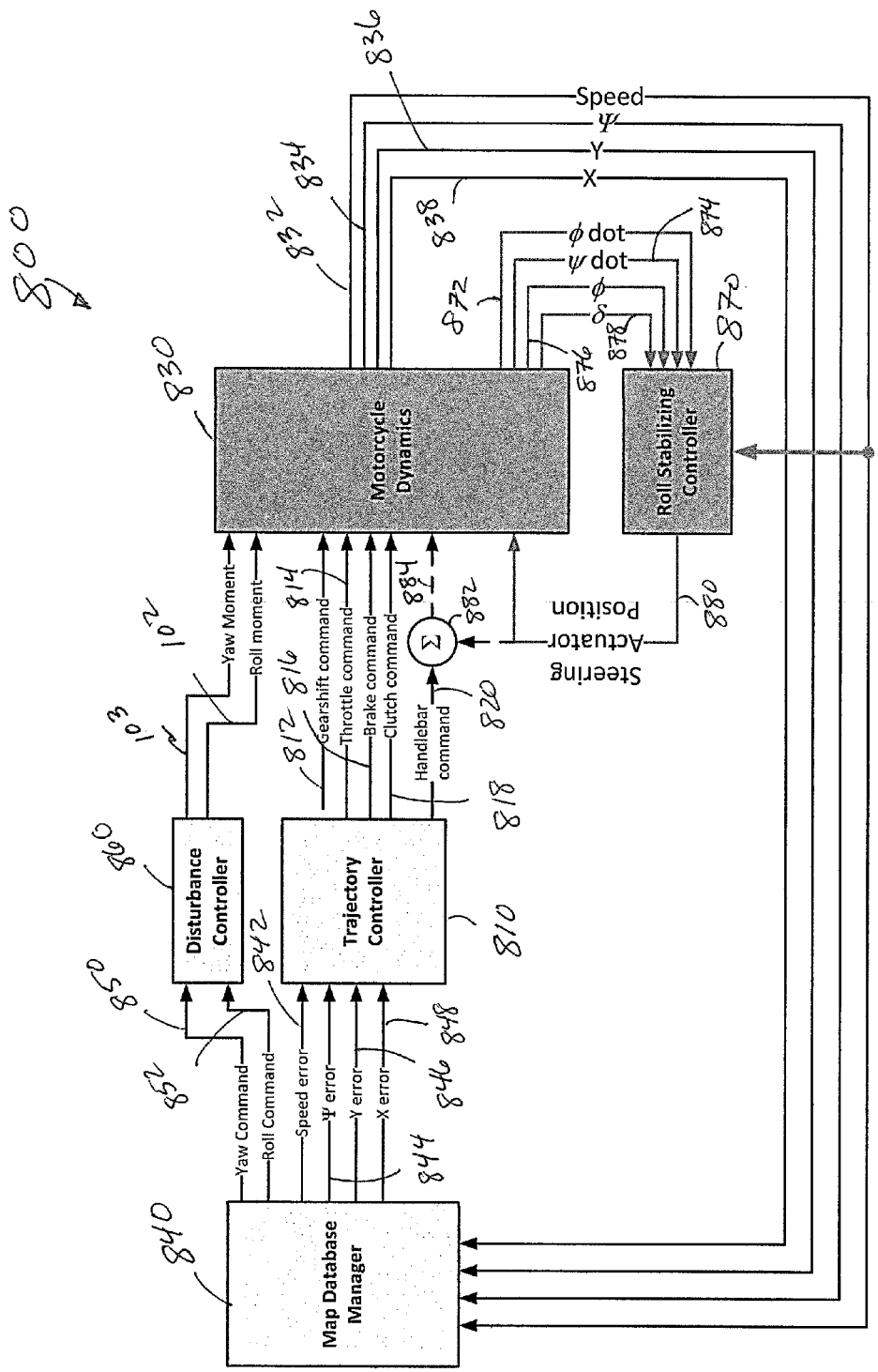
FIG. 8 is a block diagram of a control system in accordance with an exemplary embodiment.

Referring now to FIG. 8, shown in block diagram form is a control system 800 using both inner-loop roll stabilization control and outer loop control to guide the motorcycle around a test track and through various stages. A trajectory controller 810 generates a gearshift command 812, a throttle command 814, a brake command 816, a clutch command 818 and a handlebar angle command 818 in order to cause the motorcycle to drive around the test track in accordance with a map database. Disturbance controller 860 includes moment generation system 110 and receives yaw and roll commands 850 and 852 from a map database manager 840. Map database manager 840 can also implement portions of moment generation system 110, such as portions of reaction wheel control 112 which can be distributed between map database manager and disturbance controller 860. In response to yaw and roll commands 850 and 852, disturbance controller 860 uses the reaction wheel features discussed above to generate yaw moment 103 and/or roll moment 102. At very low speeds in the capsize mode of operation, these moments are used to stabilize the motorcycle and keep it upright. After the motorcycle achieves sufficient speed to be completely or primarily stabilized through steering, yaw and roll commands 850 and 852 are used to introduce disturbances for purposes testing durability and performance by simulating the body positioning and movements of a typical human driver for example when cornering), by introducing large disturbances to simulate difficult conditions (e.g., wind gusts), etc.

Motorcycle dynamics block 830 represents both motorcycle 100 and the sensors which measure speed 832, roll angle phi $\phi$ (measured by an inclinometer or two GPS antennas mounted along the lateral axis of the vehicle), and positions Y 836 and X 838, and thus is a representation of what motorcycle 100 is physically doing on the road. These output signal values are provided in an outer feedback loop to map database manager 840 which then calculates and outputs a speed error signal 842 based on the differential between the commanded speed and the measured speed, a roll angle error signal 844 based on the differential between the intended roll angle and the measured roll angle, and position Y error signal 846 and position X error signal 848 based on the differences between the measured position values and the intended position values. Trajectory controller 810 then uses these error signals in a closed loop feedback system to adjust signals 812, 814, 816, 818 and 820 accordingly.

System 800 also implements a stability feedback system for controlling steering in the higher speed weave mode of operation where stability can be achieved without the required use of disturbance controller 860. In this mode of operation, a sensed or measured yaw angle rate $\psi$-dot (psi-dot) 872 of the motorcycle, a sensed or measured roll angle rate $\phi$-dot (phi-dot) 874 of the motorcycle, a sensed or measured roll angle $\phi$ (phi) 876 of the motorcycle, and a sensed or measured angle $\delta$ (delta) 878 of the front frame (handlebars) with respect to the rear frame (i.e., the angle of the steered front wheel with respect to the main motorcycle frame) are fed through a roll stabilization controller 870 which generates a feedback steering or handlebar actuator position signal 880. Yaw angle rate $\psi$-dot 872 and roll angle rate $\phi$-dot 874 are measured by an IMU (e.g., IMU 204 in FIG. 2). Angle $\delta$ (delta) 878 can be measured by an encoder or other sensor capable of measuring rotation (e.g., a potentiometer) on the motorcycle triple clamp. The feedback handlebar actuator signal 880 is combined with the commanded handlebar signal 820 at a summation node 882 to produce a feedback adjusted handlebar command signal 884 which will cause the steering actuator to adjust handlebar position to generate small moments that stabilize the motorcycle in the weave mode of operation. The motorcycle speed 832 is also a parameter to compute the desired roll angle of the motorcycle.

Roll stabilizing controller 870 determines what the handlebar force should be to keep the motorcycle at the proper roll angle. If the motorcycle is going in a straight line, the roll angle should be zero (as measured from a vertical axis). If the motorcycle is going around a corner or a curve, the desired roll angle is a function of speed and the curvature of the road. For a fixed speed, the greater the curvature (equivalently, the smaller the radius), the greater the roll angle should be so that the roll moment on the motorcycle due to centripetal acceleration on that motorcycle going around the corner is balanced by the gravity moment produced by the roll angle of the motorcycle. Nominally, if those two balance around the corner, neutral handling is achieved.

Yaw angle rate $\psi$-dot 872 in combination with speed 832 gives an estimate of curvature, from which the centripetal acceleration is computed. That centripetal acceleration times the height of the center of gravity (CG) of the motorcycle times the mass of the bike times the cosine of the roll angle is the roll moment due to centripetal acceleration. The height of the CG times the motorcycle mass time gravity times the sine of the roll angle is the roll moment due to gravity. Controller 870 generates signal 880 to adjust the roll angle to achieve balance through a corner.

Disclosed embodiments provide great potential in the testing of motorcycles, ATVs, scooters, and other similar vehicles. As discussed, motorcycle durability schedules more frequently "test the rider" than "test the bike." The difficult riding conditions used for durability testing often lead to excessive rider fatigue, rider injury, workmen's compensation claims, early retirement, and difficulty recruiting test riders. The autonomous motorcycle (under a reasonable operating envelope) will not be affected by rain and other inclement weather. Autonomous motorcycle control moves the rider out of the equation, thereby eliminating the difficulties associated with durability test riders.

Motorcycle performance can be potentially better evaluated at the edges of the performance envelope with an autonomous controller than with a human operator for a number of reasons. At the edge, the vast percentage of a rider's attention is used trying not to crash, leaving only a small portion of mental capacity used to report back how the motorcycle feels or handles. The efficacy of the rider as a subjective evaluation tool is low under these conditions. At the edge, the repeatability of both the trajectory of the motorcycle and the disturbances input to the motorcycle are poor with a human rider, making comparison of two or more test runs difficult at best, and impossible at the worst. Likewise, the efficacy of the rider as a means to generate objective, repeatable data for evaluation and analysis is also low under these conditions. There are some conditions which motorcyclists encounter which are likely to cause test riders injury; ethically, a test rider can't be asked to test the motorcycle in those high-risk conditions. For these conditions, an autonomous motorcycle may be the only option by which those conditions can be tested.

By automating these processes, the repeatability for both performance and durability testing is significantly improved. Moreover, for performance testing, precise levels of roll and yaw moments can be repeatable and accurate yaw moments imparted on a vehicle at a desired location, speed and orientation on a test facility to a significantly higher degree than can that done by a human rider. This ability to replicate test conditions greatly accelerates the development and validation process.

The advent of dual frequency, carrier phase DGPS which can be integrated with six-axis inertial measurement units facilitates the accurate measurement and control of position, speed, and orientation of the motorcycle as it traverses a test track for durability testing. Automation of that process keeps riders from taking the "easy way" around particularly difficult paths, and ensures that the data collected by the test is based on the desired test trajectory, not a trajectory which is less difficult for the test rider. For performance testing the motorcycle can be operated "at the limit" without putting a test rider at risk of a crash or injury.

At all speeds, the ability to control and stabilize a motorcycle without the use of outriggers provides a mechanism for higher fidelity testing. The use of outriggers to prevent a motorcycle from overturning affects the vehicle dynamics (adds roll and yaw inertia, creates unwanted yaw moments when the outrigger touches down, etc.). The use of outriggers has a particularly bad effect on sport bikes which have relatively low yaw and roll inertias.

Although the present invention has been described with reference to preferred embodiments, workers skilled in the art will recognize that changes may be made in form and detail without departing from the spirit and scope of the invention.

What is claimed is:

1. An autonomous vehicle control system for use on a roll-unstable wheeled vehicle to autonomously control the roll-unstable wheeled vehicle without a driver during vehicle testing, the control system comprising:
   a moment generator coupleable to the roll-unstable wheeled vehicle and configured to selectively generate a roll moment in either of first and second directions about a vehicle longitudinal axis corresponding to forward motion of the roll-unstable wheeled vehicle, wherein the moment generator comprises a reaction wheel and a motor configured to rotationally accelerate or decelerate the reaction wheel; and
   a control system operably coupleable to the moment generator and configured to control the moment generator to selectively impart roll moments on the roll-unstable wheeled vehicle to stabilize the roll-unstable wheeled vehicle or to selectively introduce destabilizing disturbances on the vehicle.

2. The autonomous vehicle control system of claim 1, wherein the motor further comprises a brake configured to selectively rotationally decelerate the reaction wheel and thereby selectively impart the roll moments on the roll-unstable wheeled vehicle.

3. The autonomous vehicle control system of claim 2, wherein the motor is configured to selectively rotationally accelerate or decelerate the reaction wheel in both of two directions, thereby selectively generating the roll moments in either of the two directions.

4. The autonomous vehicle control system of claim 1, wherein the moment generator further comprises a second reaction wheel and a motor configured to rotationally accelerate or decelerate the second reaction wheel in a direction opposite the first reaction wheel, and wherein the control system is configured to control rotational acceleration or deceleration of both of the first and second reaction wheels to thereby selectively generate the roll moment in either of the first and second directions.

5. The autonomous vehicle control system of claim 1, wherein the moment generator comprises an actuated pendulum to selectively generate the roll moment in either of the first and second directions.

6. The autonomous vehicle control system of claim 1, wherein the moment generator comprises a roll moment generator configured to impart the roll moment on the roll-unstable wheeled vehicle in the vehicle longitudinal axis, and a yaw moment generator configured to impart a yaw moment on the roll-unstable wheeled vehicle in a vehicle vertical axis.

7. The autonomous vehicle control system of claim 6, wherein the moment generator comprises the reaction wheel configured to be rotationally accelerated or decelerated about the vehicle longitudinal axis, the motor configured to rotationally accelerate or decelerate the reaction wheel about the vehicle longitudinal axis, a support frame which supports the reaction wheel and the motor, and an actuator configured to rotate the reaction wheel, the motor, and the support frame about the vehicle vertical axis, perpendicular to the vehicle longitudinal axis, wherein angular acceleration of the reaction wheel, the motor, and the support frame about the vehicle vertical axis imparts the yaw moment upon the roll-unstable wheeled vehicle about the vehicle vertical axis, and thereby the yaw moment generator comprises the reaction wheel, the motor, the support frame and the actuator.

8. The autonomous vehicle control system of claim 6, wherein the moment generator comprises the reaction wheel configured to be rotationally accelerated or decelerated about the vehicle longitudinal axis, the motor configured to rotationally accelerate or decelerate the reaction wheel about the vehicle longitudinal axis, and a lateral translation mechanism configured to move the reaction wheel laterally relative to the vehicle longitudinal axis to generate moments to compensate for persistent roll disturbances or non-uniform mass distributions about the vehicle vertical axis.

9. The autonomous vehicle control system of claim 8, wherein the lateral translation mechanism comprises a fixed frame coupleable in a fixed position relative to the roll-unstable wheeled vehicle, a translation frame supporting the reaction wheel, and an actuator configured to move the translation frame and reaction wheel with respect to the fixed frame and laterally relative to the vehicle longitudinal axis.

10. The autonomous vehicle control system of claim 1, wherein the moment generator comprises the reaction wheel and the motor configured to rotationally accelerate or decelerate the reaction wheel, and wherein the control system comprises an optimal controller configured to maintain the slowest rotational velocity of the reaction wheel in order to provide maximum torque availability from the motor for compensation of transient roll disturbances on the roll-unstable wheeled vehicle.

11. The autonomous vehicle control system of claim 1, wherein the moment generator is configured to be coupled to a motorcycle to provide autonomous control of the motorcycle.

12. The autonomous vehicle control system of claim 1, wherein the moment generator further comprises a yaw moment generator, and wherein the control system is configured to control the yaw moment generator to selectively impart a yaw moment on the roll-unstable wheeled vehicle in a vehicle vertical axis to stabilize the roll-unstable wheeled vehicle or to introduce destabilizing disturbances on the roll-unstable wheeled vehicle.

13. A method of providing autonomous control of a roll-unstable wheeled vehicle to control the roll-unstable wheeled vehicle without a driver, the method comprising:

accelerating or decelerating a reaction wheel coupled to the roll-unstable wheeled vehicle in either of first and second directions about a vehicle longitudinal axis corresponding to forward motion of the roll-unstable wheeled vehicle; and controlling the reaction wheel acceleration or deceleration to selectively impart roll moments on the roll-unstable wheeled vehicle relative to the vehicle longitudinal axis to stabilize the roll-unstable wheeled vehicle or to introduce destabilizing disturbances on the roll-unstable wheeled vehicle.

14. The method of claim 13, wherein controlling the reaction wheel further comprises selectively imparting a yaw moment on the roll-unstable wheeled vehicle relative to a vehicle vertical axis to stabilize the roll-unstable wheeled vehicle or to introduce destabilizing disturbances on the roll-unstable wheeled vehicle.

15. The method of claim 13, wherein controlling the reaction wheel further comprises selectively moving the reaction wheel laterally relative to the vehicle longitudinal axis to impart moments on the roll-unstable wheeled vehicle.

16. The method of claim 13, wherein controlling the reaction wheel further comprises selectively moving the reaction wheel in a pendulum movement to impart moments on the roll-unstable wheeled vehicle.

* * * * *